to extraction chamber. The solvent leaves the nozzles with a Reynold's number of 40,000 and flows upward in the extraction chamber with a Reynold's number of 2,700 to 8,000.
United States Patent [19]

Coenen et al.

[11] Patent Number: 4,812,233
[45] Date of Patent: Mar. 14, 1989

[54] APPARATUS FOR SEPARATING A SOLID SUBSTANCE FROM A LIQUID MIXTURE OF SUBSTANCES

[75] Inventors: Hubert Coenen, Essen; Rainer Hagen, Berlin; Klaus Reimann, Essen, all of Fed. Rep. of Germany

[73] Assignee: Fried. Krupp Gesellschaft mit beschrankter Haftung, Essen, Fed. Rep. of Germany

[21] Appl. No.: 919,295

[22] Filed: Oct. 15, 1986

[30] Foreign Application Priority Data

Oct. 15, 1985 [DE] Fed. Rep. of Germany ....... 3536622

[51] Int. Cl.$^4$ .............................................. B01D 11/04
[52] U.S. Cl. ...................................... 210/177; 210/181; 210/182; 210/511; 422/257; 422/260
[58] Field of Search ............... 210/634, 511, 177, 182, 210/195.1, 181; 422/256, 260, 257; 203/49, 43–46

[56] References Cited

U.S. PATENT DOCUMENTS

| 2,364,892 | 12/1944 | Elgin | 422/257 |
| 3,227,649 | 1/1966 | Ghormley et al. | 422/260 |
| 4,367,178 | 1/1983 | Heigel et al. | 260/403 |
| 4,491,565 | 1/1985 | Verachetert | 196/14.52 |
| 4,560,513 | 12/1985 | Coenen et al. | 260/403 |
| 4,683,063 | 7/1987 | Rice | 210/747 |

FOREIGN PATENT DOCUMENTS

| 612370 | 6/1962 | Canada | 422/256 |
| 3229041 | 9/1984 | Fed. Rep. of Germany | |

Primary Examiner—Peter Hruskoci
Attorney, Agent, or Firm—Sughrue, Mion, Zinn, Macpeak, and Seas

[57] ABSTRACT

Apparatus for separating solid substances from liquid mixtures of substances, wherein the liquid substances contained in the mixture are separated from the solid substances by countercurrent extraction with a solvent which, during the extraction process, is in a liquid or supercritical state and which, under standard conditions, is gaseous. The solvent is fed to a cylindrical extraction chamber at the lowest point of the extraction chamber. The solvent leaves the nozzles with a Reynold's number of 40,000 and flows upward in the extraction chamber with a Reynold's number of 2,700 to 8,000.

4 Claims, 1 Drawing Sheet

APPARATUS FOR SEPARATING A SOLID SUBSTANCE FROM A LIQUID MIXTURE OF SUBSTANCES

BACKGROUND OF THE INVENTION

The present invention relates to a process for separating a liquid mixture of substances comprised of dissolved solid substances and liquid substances, in which the liquid substances are separated from the solid substances by countercurrent extraction in an extraction chamber with a solvent to form a solvent phase which is loaded with the liquid substances and an extraction phase. During the extraction process, the solvent, which, under standard conditions, is gaseous, is in a liquid or supercritical state. The solvent phase which is loaded with the liquid substances is removed from the extraction chamber, and subsequently, by pressure reduction and/or temperature changes, resolved into its component parts. Solvent is recovered during this resolving and the recovered solvent is returned to the extraction chamber. The present invention also relates to an apparatus for implementing this process.

A process of the type described above is known from DE-OS 3 229 041. There, a process is suggested to separate lecithin from mucilage, a by-product of the production of vegetable fats and oils, by extraction of the mucilage with a solvent which is gaseous under standard conditions. In this process, the mucilage is extracted under a pressure of $2 \times p_k$ to 500 bar and at a temperature of 0° C. to $<T_k$, within 15 to 60 minutes. The loaded, compressed solvent phase which forms is first separated from the insoluble lecithin, and then the extracted liquid substances are separated from the loaded, compressed solvent phase. The gaseous solvent which is recovered is returned to the extraction chamber. The extraction phase which forms in the extraction chamber contains lecithin and solvent, and after the extraction phase is removed from the extraction chamber, the lecithin is recovered from the extraction phase in solid form by evaporation of the solvent. As used herein, the symbol $p_k$ = critical pressure of the solvent; the symbol $T_k$ = critical temperature of the solvent; and standard conditions = 0° C., 1 bar. Carbon dioxide, ethane and/or ethylene or a mixture of one or several of these gases with methane, propane and/or propylene are used as gaseous solvents. In this process, it is difficult to recover the solid substance (lecithin) consistently in powder form since in some charges, the recovered solid substance was in the form of blocks or large clumps which had a negative effect on the quality of the product.

SUMMARY OF THE INVENTION

An object of the present invention is to provide an apparatus for implementing a process of the type mentioned above in which the solids to be separated from the liquid mixtures always are recovered in powder form.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides an apparatus for separating a liquid mixture of substances comprised of a dissolved solid substance and liquid substances, in which the liquid substances are separated from the solid substance by countercurrent extraction in an extraction chamber with a solvent to form a solvent phase which is loaded with the liquid substances and an extraction phase, the solvent, during the countercurrent extraction, is in a liquid or supercritical state and under standard conditions, is gaseous, the solvent phase which is loaded with the liquid substances is removed from the extraction chamber, the solvent phase is resolved by pressure reduction and/or temperature change into its component parts to recover gaseous solvent, and the recovered gaseous is returned to the solvent extraction chamber, comprising: effecting the countercurrent extraction by (a) feeding the solvent to a cylindrical extraction chamber at the lowest point of the extraction chamber through nozzles, and (b) controlling the flow of the solvent through the extraction chamber so that the solvent leaves the nozzles with a Reynolds' number of >40,000 and flows upwards in the extraction chamber with a Reynolds' number of 2,700 to 8,000.

The present invention is based on the discovery that the solid substances to be separated are recovered only as powders when a specific condition is maintained for the mass flow of the solvent in the extraction chamber, which flow is between the extremes of laminar and turbulent flow. This condition of mass flow can only be realized if the solvent is fed into the extraction chamber in a highly turbulent state in the manner set forth above.

In accordance with a preferred embodiment of the present invention, the liquid mixture to be treated contains 5 to 75% by weight solid substances dissolved in the liquid mixture to be treated, and the mass flow of the liquid solvent feed into the extraction chamber is between 140 to 170 kg/m². h in relation to the cross sectional area of the extraction chamber. By maintaining the above mass flow and the content of solids in the mixture, a solid in powder form is produced by economical means. The process of the invention can be implemented especially well if the liquid mixture which is treated comprises, by weight, 50 to 70% of lecithin and remainder of vegetable oil.

In another aspect of the present invention, there is provided an apparatus for separating a dissolved solid substance from a liquid mixture of substances by countercurrent extraction in an extraction chamber with a solvent to form a solvent phase which is loaded with the liquid substances, the apparatus containing at least one separator connected to the extraction chamber for separating the solvent from the liquid substances, means for returning the separated solvent to the extraction chamber; comprising a cylindrical pressure-resistant countercurrent extraction chamber having a diameter-heigth ratio of 1:5 to 1:10, and nozzles at the bottom of the extraction chamber for supplying solvent to the extraction chamber.

The use of a slender, cylindrical extraction chamber without anything built into it, in conjunction with the nozzles built directly into the bottom of the extraction chamber, assures that the mass flow maintained is in accordance with the present invention.

In a preferred embodiment of the apparatus of the present invention, the nozzles are in the form of bores located radially on at least one tube ferrule that is fastened to the bottom of the extraction chamber wherein the axes of the radial bores form an angle of 0° to 60° with the axis of the extraction chamber. Alternatively, the nozzles are in the form of bores which are located on a plate fastened to the bottom of the extraction chamber wherein the axes of the bores run parallel to the axis of the extraction chamber. Both arrangements provide for even distribution of the solvent in the extraction chamber.

Preferably, the means for returning the separated solvent to the extraction chamber comprises a compressor connected to the separator for compressing the separated solvent and a heat exchanger connected to the compressor for heating the compressed solvent; It is to be understood that both the foregoing general description and the following detailed description are exemplary and explanatory, but are not restrictive of the invention.

BRIEF DESCRIPTION OF THE DRAWINGS

FIG. 2b shows a cross sectional view taken along line a—a of FIG. 2a.

FIG. 3b is a cross-sectional view taken along line b—b of FIG. 3a.

DETAILED DESCRIPTION OF THE INVENTION

Figure 1:
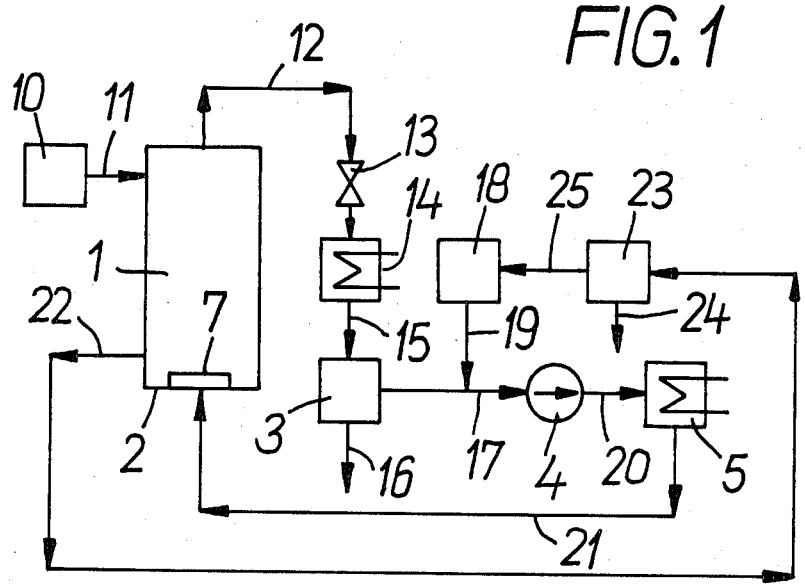
FIG. 1 shows one embodiment of a flow chart that can be used to practice the process of the present invention.

Referring now to the drawings, there is shown in FIG. 1 a storage tank 10 which contains the liquid mixture which is to be treated. The liquid mixture which is to be treated is fed from storage tank 10 into the top of an extraction chamber 1 by way of a pipe 11. Extraction chamber 1 contains no built-in device to facilitate separation of the substances in the liquid mixture and is designed as a cylinder with a diameter to height ratio of 5 to 1:10. Extraction chamber 1 contains a bottom 2 on which nozzles are provided. The nozzles are the means by which the solvent is fed into extraction chamber 1 and towards the liquid mixture in counterflow to the liquid mixture. During the countercurrent flow of the solvent upwardly through extraction chamber 1, a solvent phase is formed which comprises solvent and liquid substances which have been extracted from the liquid mixture. At the head of extraction chamber 1, the solvent phase, which is loaded with the liquid substances, is drained or removed by a pipe 12, and then is relaxed (pressure is reduced) in a valve 13, is heated in a heat exchanger 14, and conveyed by a pipe 15 into a separator 3 where the liquid substances drop out (separate, as by gravity) from the solvent. The so separated liquid substances are withdrawn from separator 3 by pipe 16. Thus, the solvent phase is resolved into its components, that is, the solvent phase is separated into solvent and liquid substances.

The gaseous solvent developed in separator 3 reaches a compressor 4 by way of a pipe 17 and, subsequently, a heat exchanger 5 by way of a pipe 20. In these devices, the solvent is liquified and the extraction pressure and temperature are adjusted. Loss of solvent is compensated by feeding a specific amount of solvent from a storage tank 18 through a pipe 19 into pipe 17. The solvent, which is in a liquid or supercritical state, is fed into extraction chamber 1 by a pipe 21. After the liquid substances have been extracted from the mixture in extraction chamber 1, an extraction phase comprised of solids mixed with solvent is present in extraction chamber 1 and this extraction phase then is conveyed from extraction chamber 1 by a pipe 22 into a chamber 23 where the remaining solvent is evaporated and reaches storage tank 18 by way of a pipe 25. The solids in powder form are removed from chamber 23 by a pipe 24.

Figure 2A:
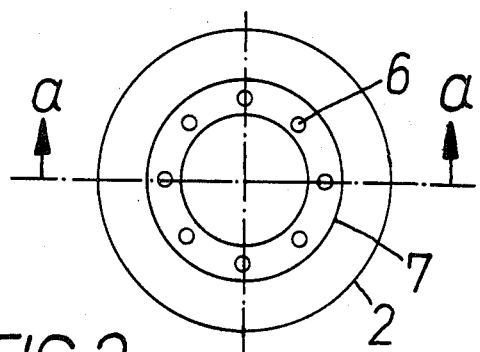
FIG. 2a shows a top view of the bottom of an extraction chamber with a tube ferrule and nozzles, made in accordance with one embodiment of the apparatus of the present invention.
Figure 2B:
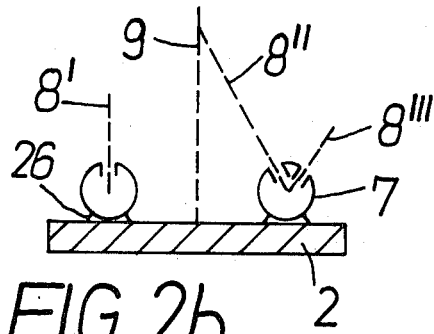

The solvent is fed into extraction chamber 1 by nozzles 6 which are located directly at bottom 2 of extraction chamber 1. Suitable as nozzles 6 are bores which are arranged in a tube ferrule (tubular ring) 7. The solvent is expelled upwardly through extraction chamber 1 from nozzles 6. Axes of the bores can form an angle of 0° to 60° with axis 9 of extraction chamber 1. The bores in extraction chamber 1 can be arranged to be parallel with axis 9 as shown by axis 8' in FIG. 2b, or can be arranged to be aligned toward the inside of extraction chamber 1 as shown in FIG. 2b by axis 8'', or toward the outside of extraction chamber 1, as shown by axis 8''' in FIG. 2b. Tubular ferrule 7 is fastened by a mounting 26 on bottom 2 of extraction chamber 1. The solvent is placed into tube ferrule 7 by way of a pipe that is not shown in the drawing.

Figure 3A:
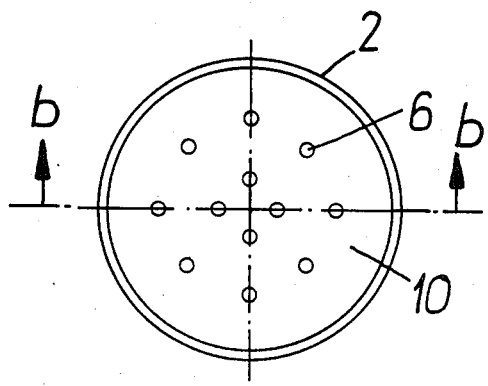
FIG. 3a shows a top view of the bottom of an extraction container with a plate and nozzles, made in accordance with another embodiment of the apparatus of the present invention.
Figure 3B:
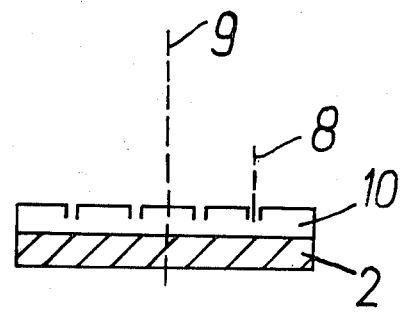

Instead of tube ferrule 7, a plate 10, as shown in FIGS. 3a and 3b directly attached to bottom 2, can be utilized in which the bores, acting as nozzles 6, are arranged in such a way that axes 8 of the bores are parallel to axis 9 of extraction chamber 1.

Plate 10 is designed as a hollow body which is fastened to bottom 2 of extraction chamber 1 and to which the solvent is conveyed by way of a pipe that is not shown in the drawing. Both nozzle arrangements (FIGS. 2a and 3a) provide for even distribution of the solvent over the cross section of the extraction chamber which results in excellent extraction output.

The solvent used in the present invention is one which is gaseous under standard conditions, that is to say, at 0° C. and 1 bar. This solvent is suitable for extraction when it is in liquid or supercritical state. The liquid state is defined by the pT-diagram and is achieved by cooling a gas and compressing it to a specific pressure. The supercritical state exists when the gas exhibits a pressure and temperature which are above the critical pressure or, respectively, the critical temperature. As solvents which are gaseous at standard conditions, carbon dioxide and low-molecular hydrocarbons are appropriately used to implement the process of the invention.

The Reynold's number $Re_E$ for the extraction chamber is defined as $$Re_E = \frac{u \cdot d}{\gamma} = \frac{4 \, m_g}{d \cdot \pi \cdot \eta}$$

u = flow velocity of the extraction agent in the extraction chamber;
d = diameter of cylindrical extraction chamber;
$\gamma$ = kinematic viscosity of the extraction agent;
$m_g$ = mass flow of extractive agent;
$\eta$ = dynamic viscosity of extractive agent.

The Reynolds number $Re_B$ for the bore diameter is defined as $$Re_B = \frac{u_B \cdot d_B}{\gamma} = \frac{4 m_g}{d_B \cdot \pi \cdot \eta \cdot n}$$

$u_B$=current velocity of the extraction agent in the nozzle;
$d_B$=nozzle diameter;
$\gamma$=kinematic viscosity of extractive agent;
$m_g$=mass flow of extractive agent;
$n$=number of nozzles.

On the basis of these relationships, there is some leeway in setting the number and diameter of the nozzles which is restricted by construction considerations and by the need for even distribution of gas in the extraction chamber. It is, therefore, possible within certain limits to vary the number and diameter of the nozzles in relation to the size of the extraction chamber and the quantity of the substance transferred.

EXAMPLE

In a cylindrical extraction chamber, standing vertically, with an inside diameter of 109 mm, a height of 850 mm, and a volume of 7.93 1, 700 g raw lecithin with an oil content of 40% by weight was fed in over a period of one hour. Carbon dioxide flowed through the extraction chamber at 350 bar and 60° C. as well as at a mass flow of 80 kg $CO_2$/h. At the bottom of the extraction chamber, a tube ferrule with an external diameter of 90 mm and a tube diameter of 3 mm was installed as solvent distributor, whose wall had 20 bores with a diameter of 0.3 mm. The bores were inclined toward the cylindrical axis of the extraction chamber at an angle of 0° and 60°, whereby the inclinations were oriented toward the inside of the extraction chamber. The solvent was fed to the tube ferrule by way of a soldered pipe. The pressure difference between the inside of the tube ferrule and the extraction chamber was 20 bar.

The oil-loaded carbon dioxide was withdrawn from the top of the extraction chamber whereby the small lecithin particles were prevented from being carried along by a packing of steel wool. After cutting off the supply of raw lecithin at the end of one hour, the solvent flow was kept going for another hour. During the two-hour extraction, the extracted oil was separated from the loaded solvent phase by reducing the pressure to 60 bar.

After the two-hour extraction period, the pressure in the extraction chamber was relieved (reduced) and the de-oiled lecithin was withdrawn from the extraction chamber. It was in pulverized form, the medium grain size was about 50 $\mu$m, and the lecithin content was 95.6%. The extracted oil still contained 1.0% lecithin.

All percentages shown above are related to weight.

It will be understood that the above description of the present invention is susceptible to various modifications, changes and adaptations, and the same are intended to be comprehended within the meaning and range of equivalents of the appended claims.

What is claimed is:

1. Apparatus for recovering a powder by separating a dissolved solid substance from a liquid mixture of substances by countercurrent extraction in an extraction chamber with a solvent in the liquid or supercritical state to form a solvent phase which is loaded with the liquid substances and an extraction phase comprising said solid substance and solvent, the apparatus comprising:

means for introducing said liquid mixture into said extraction chamber, means for recovering said solvent phase from said extraction chamber, means for recovering said extraction phase from said extraction chamber, means for separating said solid substance in powder form from said solvent, at least one separator connected to the extraction chamber for separating the solvent from the liquid substances, means for returning the separated solvent to the extraction chamber, a cylindrical pressure-resistant countercurrent extraction chamber which does not have any internal components and which has a diameter-height ratio of 1:5 to 1:10, and, nozzle means arranged directly at the bottom of the extraction chamber for supplying solvent to the extraction chamber, the nozzle means being in the form of bores and forming an angle of 0° to 60° with the axis of the extraction chamber, the nozzle means being selected in a number and bore-width to control the flow of solvent through the extraction chamber so that the solvent leaves the nozzle means with a Reynolds number of greater than 40,000, and flows upward through the extraction chamber with a Reynold's number of 2,700 to 8,000.

2. Apparatus in accordance with claim 1, wherein the nozzles are in the form of bores which are placed radially in at least one tube ferrule fastened to the bottom of the extraction chamber, and the axes of the radial bores form an angle of 0° to 60° with the axis of the extraction chamber.

3. Apparatus in accordance with claim 1, wherein the nozzles are in the form of bores which are located on a plate which is fastened to the bottom of the extraction chamber, and the bores have axes which run parallel to the axis of the extraction chamber.

4. Apparatus according to claim 1, wherein the means for returning the separated solvent to the extraction chamber comprises a compressor connected to the separator for compressing the solvent, and a heat exchanger connected to the compressor to adjust the temperature of the compressed solvent.

* * * * *